Patented Mar. 3, 1925.

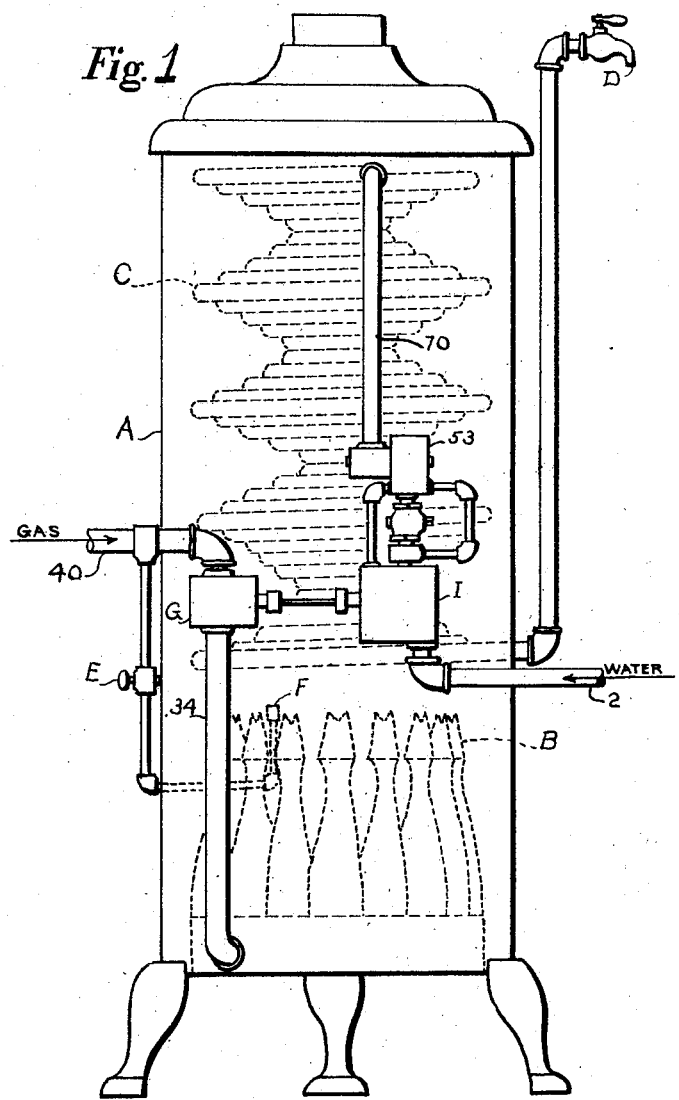

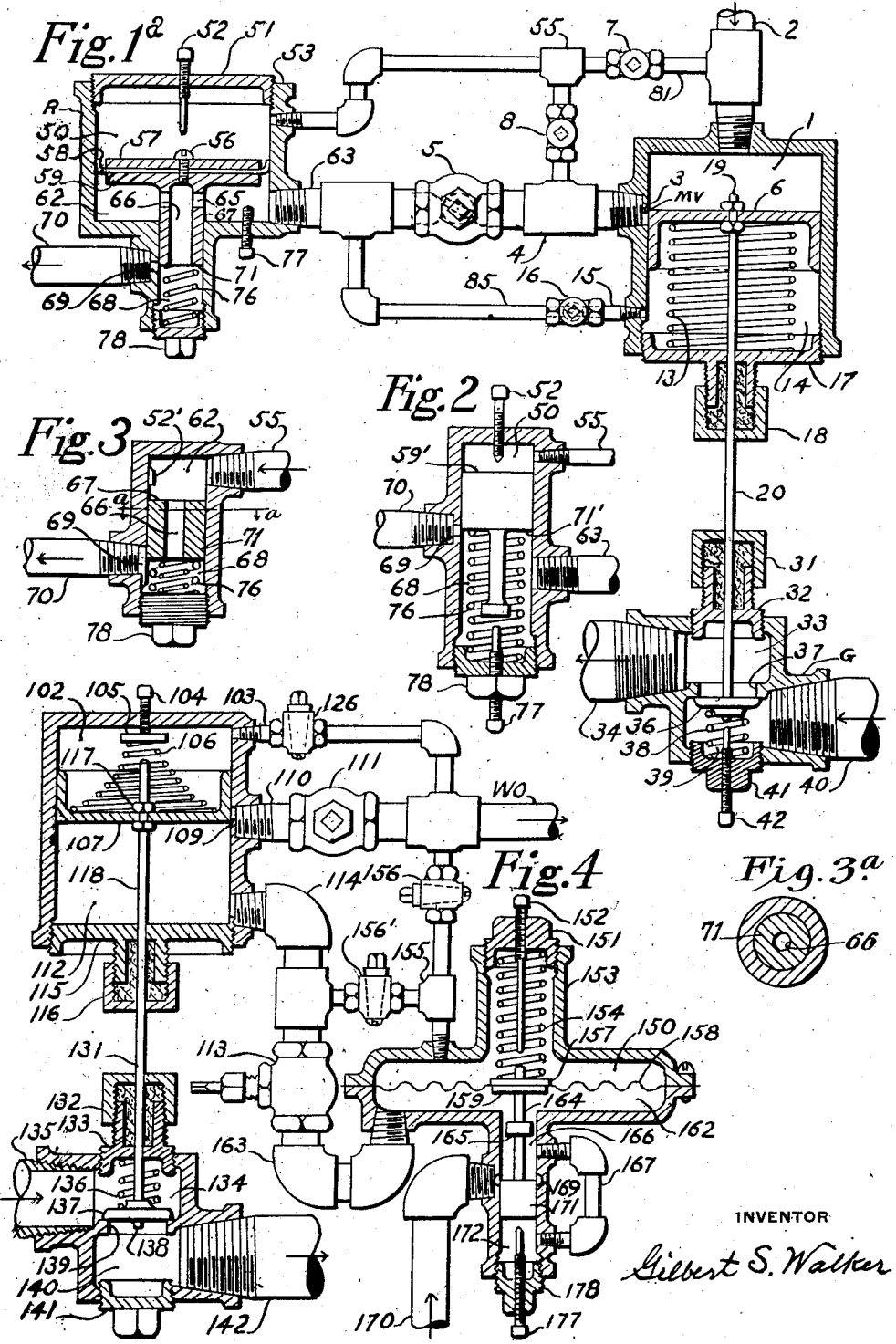

1,528,038

UNITED STATES PATENT OFFICE.

GILBERT S. WALKER, OF PITTSBURGH, PENNSYLVANIA.

AUTOMATIC WATER HEATER.

Application filed November 4, 1919. Serial No. 335,646.

*To all whom it may concern:*

Be it known that I, GILBERT S. WALKER, a citizen of the United States, residing at Pittsburgh, in the county of Allegheny and State of Pennsylvania (whose permanent post-office address is American Society of Mechanical Engineers, 29 West Thirty-ninth Street, New York, N. Y.), have invented a new and useful Improvement in Automatic Water Heaters, of which the following is a specification.

All automatic water heaters heretofore produced have operated much of the time at less than their full capacity due to the fact that the full amount of water could not pass the valves at small difference of water pressure, after the heater had been set for greater difference of pressure. The high price of these heaters frequently induced the user to install one of too small a size, and for him then to find that it seldom gave even the rated amount of water caused dissatisfaction. These heaters also gave hot water that varied in temperature to an objectionable extent. When the pressure of the water supply fell below normal the temperature of the hot water would be above normal, in spite of the fact that sensitive theremostats were provided to regulate the valves. High supply pressure also resulted in the hot water being below the normal temperature, especially in the basement.

The object of my invention is to automatically maintain a uniform flow of water at the rated capacity of the heater, say four gallons per minute, no matter how the conditions vary. With this uniform flow of water a thermostat, even though not very sensitive, will easily keep the temperature of the water within narrow limits by regulating the flow of gas. With the hand operated water regulating valves heretofore used set for four gallons a minute, more than four gallons were delivered in the basement and less than four gallons in the upper stories. This caused a corresponding variation in the temperature of the water which the thermostat could not entirely correct, and it also caused a reduction in the capacity of the heater during much of the time it was in use. My water governor remedies these defects.

Referring to the drawings:

Fig. 1 is a general view of the heater.

Figure 1a is a section through all the important parts of the invention.

Figure 2 is a section of a modified form of the water governor.

Figure 3 is a section of another modified form of the water governor.

Fig. 3a is a cross section of the same on line *a—a* of Fig. 3.

Figure 4 shows a modified way of applying a water governor to a water heater.

Referring to Fig. 1, the heater has a casing A inside of which are the main burners B. C is the water heating coils. D is a hot water outlet faucet. E is a small valve controlling the pilot light F. 40 is the gas supply. G is the gas valve and 34 is the gas pipe leading to the main burners. I is the water motor and 2 is the cold water inlet. 53 is the governor valve which is the novel feature.

Referring to the form shown in Fig. 1a, a well known combination of water motor I, water valve MV and gas valve G, for automatically bringing the water heater into operation when water is drawn, is shown at the right. The numeral 1 designates the inlet chamber of the water motor, which chamber communicates with the water inlet pipe 2. Carefully fitted in the chamber is a motor piston 6 adapted to close the port 3, which port communicates with the pipe 4 and thence through the valve 5 with the water governor described below. The motor spring 13 bears against the motor piston 6 and against a screw head 17 at the back of the water motor. The back chamber 14 communicates with the pipe 15 and thence through the small or nearly closed valve 16 with the pipes 85 and 63. The stem 20 is attached at 19 to the motor piston 6 and passes first through a stuffing box 18, then through a stuffing box 31 and its lower end is adjustably connected to a gas valve 36. A head 32 closes the end of the gas outlet chamber 33. This outlet chamber communicates with a gas outlet pipe 34 conducting gas to the burners B. The gas valve 36 is adapted to close on its seat 37. The inlet chamber 39 communicates with the gas inlet pipe 40. The screw head 41 that closes the lower end of the inlet chamber 39 also adjusts the spring 38 and carries a limit stop 42.

The water operated governor or governor motor is shown at R. The back chamber 50 of the cylinder 53 is closed by a screw head 51 carrying a screw 52 adapted to limit the movement of the governor piston 59. A pipe 55 communicates with the back chamber 50 and, through cock 7, with the water inlet pipe 2. The inlet side of the valve 5 also communicates through valve 8 with the pipe 55. The chamber 62 below the governor piston 59 communicates with the pipe 63, pipe 85, and also through the partly closed valve 5 with pipe 4. There is packing 58 between the governor piston 59 and the plate 57, held by a screw 56. The governor piston 59 operates a valve 71 of the balanced type. This valve is in the form of a piston adapted to close the port 69 and regulate the flow of water through the heater. Through the valve 71 and the member 67 attaching it to the piston is a passage 66 and one or more holes 65 which may be of small enough size to cause an appreciable loss of pressure between chamber 62 and chamber 68 when the water is flowing through at the full capacity of the heater. The port 69 communicates with the pipe 70 leading to the upper end of the heater coil C. In the chamber 68 there is a spring 76 tending to open the valve. A screw plug 78 closes this chamber and also serves to adjust the compression of spring 76. There is also a screw 77 to limit the movement of the valve.

The operation is the same as an ordinary heater but with the novel features of the water governor R, which regulates the water flow to the capacity of the heater, regardless of changes in water pressure. Several types of such governors are in common use on drinking fountains, hydraulic elevators and other hydraulic machinery. The valve 71 can regulate the water flow in more than one way. Any one of these is sufficient and the other parts may be omitted.

When a hot water faucet D is opened, cold water flows from the water inlet pipe 2 into the water motor inlet chamber 1. At the same time some water flows out of the back chamber 14, through valve 16, pipe 85, pipe 63, chamber 62, passage 66, chamber 68, port 69, pipe 70, and thence through the heater to the open faucet. This small initial flow moves the motor piston 6 back and opens gas valve 36, and also opens the motor water-valve MV by uncovering port 3, thus putting the heater into operation. The water now flows freely from the water inlet pipe 2, through the water motor inlet chamber 1, port 3, pipe 4, valve 5, pipe 63, chamber 62, passage 66, chamber 68, port 69, pipe 70, heater coil and out at the open faucet.

Too large a flow through 66 will reduce the pressure in chamber 68 close port 69 more or less and limit the flow as explained more fully in connection with Fig. 3. But without this feature, difference of pressure on the two sides of the governor piston 59 will move the valve 71 against the spring 76 close the port 69 more or less and reduce the flow of water through the heater. If the pressure in chamber 62 gets nearer to that in the back chamber 50 the spring 76 will open port 69 more or less and increase the flow of water through the heater. Any change in the quantity of water flowing through the restriction at 3 or 5 will change the difference of pressure on the two sides of the governor piston 59 and move the valve 71 until the flow is nearly normal again.

The valve 71 and the governor piston 59 which operates it must move easily so as to respond readily to slight changes of difference of pressure between chambers 50 and 62, to maintain a nearly uniform flow of water and therefore a nearly uniform difference of pressure between the two sides of the restriction at valve 3. This uniform difference of pressure between the two sides of the restriction corresponding to a uniform flow through the restriction enables the device to compensate for variations in back pressure in the hot water outlet pipe or variations of direct pressure in the cold water inlet pipe. This same uniform difference of pressure is also kept on the motor piston 6, so that hot water may be delivered at as great an elevation as with previous heaters.

The valve 71 when operated by the governor piston 59 will keep a uniform difference of pressure at the port 3 or at any hand adjusted water valve such as 5 or the type of valve commonly used on this kind of heater, and will thus insure a uniform flow of water at the rated capacity of the heater, say four gallons per minute, no matter how the conditions vary.

In Fig. 2 is shown a modified form of a part of my invention in which the governor and valve are consolidated to simplify the structure. The gas valve and motor are not shown but are of well known construction or like those shown in connection with the previously described form. The water enters from pipe 55 to chamber 50. The valve 5 is adapted to partly close the pipe 63 which communicates with chamber 68. The piston is shown at 59'. Its edge 71' is adapted to close port 69 communicating with the water pipe 70. The spring 76 opens the valve. It is adjusted by the screw plug 78 and there is a motion limit at 77.

The chamber 50 communicates by pipe 55, through valve 5, with pipe 63 as shown in the previous figure. But, in this form the piston valve 59' has its lower edge 71' adapted to cover the port 69 which communicates with the pipe 70. Attached to this piston valve is a stem. The chamber 68 communicates with pipe 63. The spring 76 in the chamber 68 tends to open the port 69. This spring 76 is adjustable by means of screw 78. The screw 77 can be adjusted to keep the port 69 always partly open.

When a hot water faucet is opened the unbalanced pressure on piston 59' will close port 69 more or less. Reduced difference of pressure on piston 59' will permit spring 76 to open port 69 just enough to keep a uniform difference of pressure between chambers 50 and 68 enabling the device to regulate the flow of water regardless of the total difference of pressure between pipes 55 and 70.

In Fig. 3 is shown a simpler form of the device for obtaining a nearly uniform flow of water through any heater in spite of moderate variations of pressure. The water enters the chamber 62 from the pipe 55 and flows through the friction passage 66 in the piston valve 71 and out at 70. The piston valve is pressed up by concentric springs 76, the movement being limited by a stop 52'. The screw plug 78 in the lower end of the chamber serves to adjust the spring pressure. The lower edge of the piston valve 71 is adapted to nearly close the port 69. When the desired quantity of water is flowing, the upward pressure of the spring and the downward pressure and friction of the flowing water balance each other. A larger volume of water moves the piston valve down and closes the port more or less. A smaller volume of water lets the piston valve move up and open the port.

In all of the forms various modifications in the water connections readily suggest themselves to every one, and the water may be passed through in the opposite direction if the modifications obviously necessary in that case be made.

Referring to the modified form shown in Fig. 4; there is a combination water motor and water valve operating the gas valve 137. The back chamber 102 at the top of the water motor communicates with pipe 103 and through valve 126 with the water outlet pipe WO. A screw 104 presses a plate 105 against a motor spring 106 and adjusts it. A motor piston 107 is adapted to uncover a port 109 and open up communication through pipe 110 and valve 111 with the water outlet pipe WO. The inlet chamber 112 is in communication with a pipe 114, and through a hand adjusted water valve 113 with a pipe 163. The lower end of the inlet chamber is closed by a head 115. A stem 118 is connected at 117 to the motor piston 107, passes through a stuffing box 116 and connects with the gas valve stem 131 passing through a stuffing box 132. A screw head 133 can be turned to adjust the pressure on the spring 136. The gas valve 137 is adjustably attached at 138 to its stem 131 and is adapted to close on its seat 139 and cut off the flow of gas from the gas inlet pipe 135 and inlet chamber 134 to the outlet chamber 140 and outlet pipe 142, which leads to the burners of the water heater, not shown.

A water governor is shown at the right. The end of its back chamber 150 is closed by a screw plug 151 which can be screwed into the casing 153 more or less to adjust the spring 154. There is a screw 152 to limit the closing of the port 169. The back chamber 150 communicates with pipe 155 and through the cock 156 with the outlet pipe WO, and through the by-pass cock 156' to pipe 114 and thence through valve 113 to pipe 163. The diaphragm 158 separates the back chamber 150 from the chamber 162 which latter communicates with pipes 163 and 114. A loosely fitted piston 165 partly obstructs the chamber 166. The area of the annular water passage between it and the chamber walls may be so small that when the desired quantity of water flows the friction and difference of pressure on the two sides of this piston will be sufficient to move it and the attached valve 171 to regulate the flow of water. Below this piston the chamber 166 communicates with the pipe 167. Further down the port 169 communicates with the water inlet pipe 170. This port 169 is adapted to be closed by the valve 171 adjustably connected to the diaphragm at 157 and 159 by the stem 164. The lowest chamber 172 communicates with pipe 167 to form a by-pass about the valve 171 to balance it. The end of the chamber 172 is closed by a plug 178 carrying a screw 177 to limit the movement of the valve.

Opening any hot water faucet reduces the water pressure in the hot water pipes and in back chamber 102. The water at inlet pressure in chamber 112 now causes the motor piston 107 to move up as fast as the valve 126 will permit and open the gas valve 137. When the motor piston uncovers the port 109 a flow of water is established from the water inlet pipe 170, through port 169, chamber 166, pipe 163, valve 113, pipe 114, chamber 112, port 109, pipe 110, valve 111, to the water outlet pipe WO.

If either valve 156 or by-pass valve 156' is opened slightly the parts can be adjusted to regulate the water passing through the heater to a uniform flow. Friction at 113, 111 or 109 produces a difference of pressure on the two sides of the diaphragm 158. The spring 154 is adjusted to keep port 169 partly open in spite of this and allow the rated amount of water to flow through the heater. Any increase in the difference of pressure at the valve 113, above that for which the spring 154 is adjusted, causes valve 171 to close and nearly restore the normal flow.

In the various figures several equivalent elements are shown that are interchangeable and their use is not limited to the particular figure in which each is shown.

I claim:

1. In an automatic water heater, the combination with a conduit conveying water to and through the heater, of a casing interposed in the conduit and provided with a port, a piston valve mounted in the casing so that the movements thereof will open and close the port, and yielding means acting upon the piston valve to move the same in a direction to open the port, said piston valve being provided with a restricted passage through which the water flows in a direction tending to move the valve to close the port.

2. In an automatic water heater, the combination of a casing, a balanced valve therein to control the flow of water, a member attached to the valve to partly obstruct the flow of water and cause the flowing water to exert a closing force on the valve, and a spring exerting an opening force on the valve.

3. In an automatic water heater, a valve to limit the flow of water through the heater to a certain number of gallons a minute, a second valve to regulate the pressure on the first mentioned valve for the purpose of enabling the first mentioned valve to accomplish its purpose in spite of changes in water pressure, and means actuated by differences of water pressure to operate the second valve.

4. In an automatic water heater, a burner for heating the water, a fuel valve to control the burner, a water motor to operate said fuel valve, a water valve to automatically regulate the flow of water through the heater, a governor water motor to operate said water valve, means for producing a difference of water pressure proportional to the quantity of water flowing through the heater and communicating said difference of water pressure to both water motors.

5. In an automatic water heater, a pipe conveying water, a means therein to cause a difference of water pressure while water is flowing, two water motors operated by said difference of pressure, a water valve operatively connected to one of said motors to regulate the flow of water, and a fuel valve operatively connected to the other motor.

6. In an automatic water heater, the combination with a water motor which is operated by differences of water pressure, means actuated by the water motor for controlling the flow of water through the heater, a governor motor operated by differences of water pressure, a water valve operatively connected with the governor motor, and means providing a restricted passage through which the water flows, the outlet end of the restricted passage being in communication with the inlet side of the before mentioned water valve, and also in communication with the low pressure side of each of the before mentioned motors, while the inlet end of the restricted passage is in communication with the high pressure side of each of the motors and source of water supply.

7. In a water heater, the combination with water actuated means for automatically putting the heater in operation when water is drawn, of a water actuated governor operating entirely independent of any other mechanism to automatically maintain a uniform flow of water regardless of variations of pressure.

8. In a water heater, the combination with water actuated means for automatically putting the heater in operation when water is drawn, of a valve operating at a certain pressure to limit the flow of water through the heater to a predetermined quantity in a given time, and means for automatically maintaining a substantially uniform pressure on the said valve, whereby a uniform flow of water through the heater is maintained regardless of variations in pressure.

9. In a water heater, the combination with water actuated means for automatically putting the heater in operation when water is drawn, valve means operating at a certain pressure to limit the flow of water through the heater to a predetermined quantity in a given time, and means operated automatically by the water through its passage through the heater for maintaining a substantially uniform pressure on the said valve, whereby a uniform flow of water through the heater is obtained regardless of variations in pressure.

In testimony whereof I have hereunto set my hand in the presence of two witnesses.

GILBERT S. WALKER.

Witnesses:
CLARENCE A. WILLIAMS,
C. O. GRAHAM.